United States Patent Office.

JAMES R. SPEER, OF PITTSBURG, PENNSYLVANIA.

Letters Patent No. 92,221, dated July 6, 1869; antedated June 26, 1869.

IMPROVED MODE OF TREATING PIG-IRON FOR MAKING STEEL AND MALLEABLE CAST-IRON.

The Schedule referred to in these Letters Patent and making part of the same.

To all whom it may concern:

Be it known that I, JAMES R. SPEER, of Pittsburg, in the county of Allegheny, and State of Pennsylvania, have invented a new and useful Improvement in the Manufacture of Pig-Iron for Making Steel and Malleable Cast-Iron Articles, viz, horseshoes, &c.; and I do hereby declare that the following is a full, clear, and exact description thereof.

In the manufacture of malleable cast-iron, one of the greatest difficulties encountered by the manufacturer is the obtaining of a suitable article of pig-iron. It has become a well-known fact, among those skilled in the art of manufacturing articles of malleable cast-iron, that only a few "brands" of pig-iron, to wit, that which is known in commerce as "Missouri pig-iron," and pig-iron of like quality, which is very scarce, will answer the purpose, and this scarcity and difficulty in securing the proper stock for making a good article of malleable cast-iron has caused a large number of manufacturers to abandon the business of manufacturing articles of malleable cast-iron.

The object of my invention is to provide a compensation for this scarcity of suitable pig-iron for making malleable cast-iron, and thereby adapt the business of manufacturing articles of malleable cast-iron to all parts of our country. This I accomplish by treating pig-iron in the manner hereinafter described.

The nature of my invention consists in mixing red oxide of lead, black oxide of manganese, common salt, and wood-charcoal, so as to form one mass of fine particles, which mass is heated, and then stirred into melted pig-iron.

To enable others skilled in the art to use my invention, I will proceed to describe my process for treating melted pig-iron, so as to make it suitable for making articles of steel and malleable cast-iron.

I take red oxide of lead, about one pound; black oxide of manganese, about one pound; common salt, about one pound; and wood-charcoal, about one pound, and thoroughly mix and triturate the whole, so as to form one homogeneous mass, of very fine particles. This mass is then heated, by any suitable means, to about 500° Fahrenheit. I then, by any suitable means, stir this heated mass of fine particles into about two hundred pounds of melted pig-iron, which, by heat and a suitable furnace, has been reduced to its most liquid form, taking care to agitate and mix, in the most thorough manner, the heated admixture of fine particles into the melted pig-iron, so as to bring the fine particles of the admixture in contact with all the particles of the melted pig-iron.

The means used for mixing the heated mass, composed of the ingredients named, with the melted pig-iron, I leave to those skilled in the art.

After the melted pig-iron has been treated in the manner described, it is cast into bars or "pigs," of the desired form and size, and then remelted, for making cast articles, such as horseshoes, &c., which are then placed in annealing ovens, and converted into malleable cast-iron, which may afterward be converted into steel, by a process which I propose making the subject of another application for Letters Patent.

Having thus described my process for making a suitable article of pig-iron, for the manufacture of malleable cast-iron or steel,

What I claim as my invention, is—

Treating melted pig-iron with the ingredients herein named, said ingredients being used in about the proportions and manner herein specified, and for the purpose set forth.

JAMES R. SPEER.

Witnesses:
JAMES J. JOHNSTON,
GEO. H. THOMAS.